United States Patent Office 3,149,165
Patented Sept. 15, 1964

3,149,165
N-DIFLUORO-AMINO-SUBSTITUTED HYDRA-
ZINES AND THEIR PREPARATION
George N. Sausen, Wilmington, Del., assignor to E. I. du
Pont de Nemours and Company, Wilmington, Del., a
corporation of Delaware
No Drawing. Filed May 2, 1962, Ser. No. 191,756
6 Claims. (Cl. 260—583)

This invention relates to, and has as its principal objects provision of, novel and useful compositions of matter and the preparation of the same.

The compositions of this invention are defined by the formula

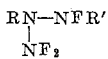

in which R and R' may be the same or different and are perfluoroalkyl, ω-hydroperfluoroalkyl, or ω-chloroperfluoroalkyl of up to 19 carbon atoms.

The compounds of this invention are obtained by subjecting a mixture of tetrafluorohydrazine, $N_2F_4$, and an azo compound of the formula R—N=N—R', in which R and R' are as already defined, to a source of chemical energy at a temperature up to 50° C.

In practice, the mixture of tetrafluorohydrazine and R—N=N—R' compound is passed through a zone illuminated with ultraviolet light, e.g., a mercury vapor lamp, and the condensible products are collected in traps cooled to a temperature which can be as low as −95° C., e.g., through the use of toluene slush as a cooling means.

The irradiation is carried out at temperatures of up to +50° C., but usually in the range of 20° to 30° C., for periods of time which can be as short as one to two minutes or can extend up to several hours, depending upon the size of the sample being irradiated and the efficiency of the light source.

Although it is desirable to carry out the reaction in vessels made of nickel or copper or alloys of these metals, the reaction can be conveniently carried out in quartz glass equipment, especially in laboratory-scale preparations.

As used herein, ultraviolet light refers to light sources of wave lengths in the range of 2500 to 4000 A.

In general, it is desirable that the light source be as close as possible to the mixture of tetrafluorohydrazine and R—N=N—R' compound. This can be accomplished by placing the lamp immediately adjacent to a transparent wall of the reaction vessel, or in a suitable well projecting into the reaction space, or by passing the reaction mixture through a tube which is exposed to ultraviolet light.

As a source of ultraviolet light there can be used any of the commercially available lamps which are high in ultraviolet light output. Generally speaking, mercury vapor lamps are preferred because they provide a relatively intense source of ultraviolet light. Many lamps of this type are available and include low and high pressure lamps with various types of envelopes. The most preferred types are those with quartz envelopes because such envelopes permit higher transmission of ultraviolet light.

The reaction between the tetrafluorohydrazine and R—N=N—R' compound can be carried out in the vapor or liquid phase under pressures which are usually autogenous.

The tetrafluorohydrazine and R—N=N—R' compound react in equimolar amounts to produce the compounds of this invention, in accord with the following schematic representation:

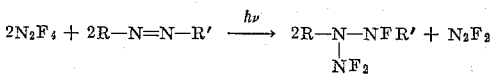

In practice, however, it is desirable to use the tetrafluorohydrazine in slight excess in order to insure complete utilization of the R—N=N—R' compound. The excess tetrafluorohydrazine is removed from the reaction mixture after completion of the reaction and may be reused, if desired.

The polyfluoroazoalkane intermediates, i.e.

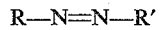

compounds, as a class, are know compounds. Thus, hexafluoroazomethane, $CF_3$—N=N—$CF_3$ (R and R' in the formula R—N=N—R', are both $CF_3$) can be prepared by the reaction of cyanogen chloride or iodide with such highly reactive fluorides as iodine pentafluoride (Ruff et al., Ber. 73, 724 (1940)) or silver bifluoride (Glemser et al., Ger. 1,005,792), or by heating at a temperature of at least 150° C. a cyanogen halide, such as, the chloride, bromide, or iodide, with a fluoride of an alkali metal of atomic number 11 to 19, as disclosed and claimed in U.S. 2,912,429.

The higher polyfluoroazoalkanes are obtained by maintaining in contact at a temperature of 25 to 250° C. (1) a polyfluoronitrile, (2) a halogen of atomic number 17 to 35, and (3) a fluoride of a metal of Group I having an atomic number from 11 through 55 until the desired polyfluoroazoalkane has been formed. The reaction which takes place may be represented by the following equation (see, e.g., Example I of U.S. Patent 3,057,849).

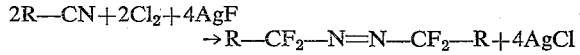

The nitrile R—CN used in the above process can be either a perfluoronitrile, an ω-chloroperfluoronitrile, or an ω-hydroperfluoronitrile. These nitriles are prepared from corresponding polyfluorocarboxylic acids, which are converted by conventional methods to the amides, and then dehydrated to the nitriles with phosphoric anhydride. The polyfluorocarboxylic acids, their salts, and amides are known compounds. Thus, U.S. 2,559,629 describes the acids $H(CF_2CF_2)_nCOOH$, U.S. 2,646,449 describes the preparation of amides $H(CF_2)_nCONH_2$, and U.S. 2,567,011 describes the perfluorocarboxylic acids, their amides, and nitriles and ω-chloroperfluorocarboxylic acids can be made by the methods described by M. W. Buxton et al., J. Chem. Soc., 1954, 366.

The halogen can be of commercial quality.

The fluoride of the Group I metal of atomic number 11 to 55 is a fluoride of one of the metals sodium, potassium, copper, rubidium, silver, and cesium. The fluorides of potassium, cesium, silver, and mercury are preferred because of their greater activity.

Usually, the reaction which leads to the formation of the ω-hydropolyfluoroazoalkane, ω-chloropolyfluoroazoalkane, or polyfluoroazoalkane is carried out under essentially anhydrous conditions.

The relative proportions of the three reactants is critical only to the extent that it is desirable to utilize as much of the polyfluoronitrile as possible. For this reason, there is generally used at least one mole, preferably at least two moles, of the metallic fluoride per mole of polyfluoronitrile. The chlorine is usually used in a molar ratio to polyfluoronitrile of 0.5:1 to 2.5:1.

The polyfluoroazoalkanes are yellow-green liquids characterized by good heat-stability and resistance to hydrolysis by 10% aqueous sodium hydroxide solution up to at least 100° C.

Exemplary ω-hydroperfluoroazoalkanes, ω-chloroperfluoroazoalkanes, and perfluoroazoalkanes are azoperfluoromethane, azoperfluoroethane, azoperfluoropropane, azoperfluorobutane, azoperfluorooctane, azo(ω-hydroperfluoropropane), azo(ω-hydroperfluoropentane), azo(perfluoroisobutane), azo(ω-hydroperfluorononane), azo(perfluorodecane), azo(ω-hydroperfluorotridecane), azo(ω-chloroperfluoropropane), azo(ω-chloroperfluorooctadecane), azo(ω-chloroperfluorododecane), and the like.

The new compositions of this invention are useful as catalysts for the polymerization of ethylenically unsaturated compounds and as energy-rich sources in propulsion systems.

The examples which follow illustrate but do not limit this invention. Chromatographic analyses were run on a 6' x 0.25" column packed with a diatomaceous earth treated with the ethyl ester of perhalooctanoic acid so as to deposit 20% by weight of the ester on the support. The column was held at 0° C., using helium as a carrier gas at a flow rate of 60 cc./min., measured at the outlet.

EXAMPLE I

A 150-cc. quartz reactor was evacuated and charged with 0.47 g. of hexafluoroazomethane and 0.30 g. of tetrafluorohydrazine, $N_2F_4$. The mixture was irradiated with a low-pressure mercury-resonance lamp at 25° C. for 1.25 hours. Two such runs were combined and the product gases were transferred to a cylinder cooled in liquid nitrogen. The by-product, elemental nitrogen, was removed by evacuation to leave 1.5 g. of crude product. This crude product was further purified by distillation from a toluene slush bath (−95° C.) to leave 1.0 g. of residue. Gas-chromatographic analysis of this residue showed it to contain 67% of 2-difluoroamino-3-fluoro-2,3-diazohexafluorobutane, $CF_3N(NF_2)NFCF_3$, 22%

$$CF_3N=NCF_3$$

and various amounts of $NF_3$ and $N_2F_4$. 2-Difluoroamino-3-fluoro-2,3-diazahexafluorobutane, $$CF_3N(NF_2)NFCF_3$$

of >99% purity was obtained as a colorless gas, B.P. 19° C., by gas-chromatographic separation of the partially purified residue.

The fluorine nuclear magnetic resonance spectrum of the purified material was obtained at −62° C. and showed four unsplit peaks at −5325 c.p.s., +840 c.p.s., +3650 c.p.s., and +4270 c.p.s. in area ratios of 2/1/3/3 in agreement with the proposed structure (56.4 mc., fluorotrichloromethane reference=0). Low temperature (−46 to −80° C.) infrared analysis of the product showed major absorption bands at 7.65–8.2μ (C—F), 9.85μ, 10.2μ, 10.8 and 11.5μ (N—F) and 13.75μ. Mass spectrometric analysis of the product showed positive ion fragments expected from a mixture of $CF_3N=NCF_3$ and $N_2F_4$ indicating that the product, $CF_3N(NF_2)NFCF_3$, was decomposed to starting materials in the spectrometer.

The 2 - difluoroamino - 3 - fluoro - 2,3-diazahexafluorobutane,

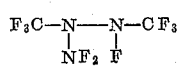

prepared as above, is useful as a polymerization catalyst. This use is illustrated below:

A ⅜" x 6" platinum tube was charged with 0.34 g. of ethylene and 19 mg. of purified 2-difluoroamino-3-fluoro-2,3-diazahexafluorobutane, $CF_3N(NF_2)NFCF_3$, and the tube was sealed and heated under 1,000 atmospheres external pressure at 40° for one hour, at 70° for two hours, and at 100° for two hours. A small amount of white, acetone-insoluble polyethylene was obtained together with a dark, acetone-soluble oil. No trace of polymer was obtained from a control run in the absence of added initiator.

EXAMPLE II

A 400-cc. quartz reactor was evacuated and charged with 1.63 g. of decafluoroazoethane, $$F_3C-CF_2-N=N-CF_2-CF_3$$

and 0.64 g. of tetrafluorohydrazine, $N_2F_4$. The mixture was irradiated with a low-pressure mercury-resonance lamp at 25° C. for 0.57 hour. The tube was cooled to −80° C. and volatile products were removed to a pressure of 1–2 mm. of mercury. The residual yellow liquid amounted to 1.53 g. Gas-chromatographic analysis of this crude product showed it to consist of a mixture analyzing 16% 3-difluoroamino-4-fluoro-3,4-diazadecafluorohexane, $C_2F_5N(NF_2)NFC_2F_5$, 81% $C_2F_5N=NC_2F_5$, and traces of a few impurities.

The mixture containing 3-difluoroamino-4-fluoro-3,4-diazadecafluorohexane,

prepared as above, is useful as a polymerization catalyst. This use is illustrated below:

An 80-cc. "Hastalloy" C-lined shaker tube was charged with 10 g. of tetrafluoroethylene, 30 g. of hexafluoropropylene dimer solvent, and 150 mg. of the $$C_2F_5N(NF_2)NFC_2F_5/C_2F_5N=NC_2F_5$$

mixture, and the tube was shaken at ambient temperature (21–27° C.) for five hours. A total of 5.9 g. (59%) of white, solid, polytetrafluoroethylene was separated from the solvent. Decafluoroazoethane itself is not a polymerization initiator at 25° in the absence of light.

Table I summarizes a series of experiments carried out following the procedure of Example I. In the table, the left column lists the polyfluoroazoalkanes used in place of the hexafluoroazomethane of Example I and the right column the products obtained.

*Table I*

| Polyfluoroazoalkane | Product |
|---|---|
| $F_3C-CF_2-CF_2-CF_2-N=N-CF_2-CF_3$ | $F_3C-CF_2-CF_2-CF_2-N(F)-N(NF_2)-CF_2-CF_3$ |
| 3,4-azoperfluorooctane | 5-difluoroamino-6-fluoro-5,6-diazaperfluorooctane. |
| $HCF_2-(CF_2)_9-N=N-(CF_2)_9-CF_2H$ | $HCF_2(CF_2)_9-N(F)-N(NF_2)-(CF_2)_9-CF_2H$ |
| Azo(ω-hydroperfluorodecane) | 1,22-dihydro-11-difluoroamino-12-fluoro-11,12-diazaperfluorodocosane. |
| $ClCF_2(CF_2)_8-N=N-(CF_2)_8CF_2Cl$ | $Cl-CF_2(CF_2)_8-N(F)-N(NF_2)-(CF_2)_8-CF_2Cl$ |
| Azo(ω-chloroperfluorononane) | 1,20-dichloro-10-difluoroamino-11-fluoro-10,11-diazaperfluoroeicosane. |

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula

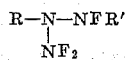

wherein R and R' are selected from the group consisting of perfluoroalkyl, ω-hydroperfluoroalkyl and ω-chloroperfluoroalkyl of up to 19 carbons.

2. 2-difluoroamino-3-fluoro-2,3-diazahexafluorobutane.

3. 3-difluoroamino-4-fluoro-3,4-diazadecafluorohexane.

4. The process which comprises reacting tetrafluorohydrazine and a compound of the formula R—N=N—R', wherein R and R' are selected from the group consisting of perfluoroalkyl, ω-hydroperfluoroalkyl and ω-chloroperfluoroalkyl of up to 19 carbons, in the presence of ultraviolet light at a temperature of up to about 50° C.

5. The process which comprises reacting tetrafluorohydrazine and hexafluoroazomethane in the presence of ultraviolet light at a temperature of up to about 50° C.

6. The process which comprises reacting tetrafluorohydrazine and decafluoroazoethane in the presence of ultraviolet light at a tempertaure of up to about 50° C.

No references cited.